United States Patent
Carnicelli et al.

(10) Patent No.: US 7,960,681 B2
(45) Date of Patent: Jun. 14, 2011

(54) SCANNING METHOD AND SYSTEM FOR A MULTIPLE LIGHT BEAM SYSTEM

(75) Inventors: Vito Carnicelli, Seyssinet Pariset (FR); Jean Christophe Lenoir, Vaulnaveys le haut (FR); Jean-Luc Simon, Grenoble (FR)

(73) Assignee: Honeywell International Inc., Morristown, NJ (US)

( * ) Notice: Subject to any disclaimer, the term of this patent is extended or adjusted under 35 U.S.C. 154(b) by 838 days.

(21) Appl. No.: 11/985,647

(22) Filed: Nov. 16, 2007

(65) Prior Publication Data

US 2009/0129784 A1  May 21, 2009

(51) Int. Cl.
*G01N 21/86* (2006.01)
(52) U.S. Cl. ..................... 250/221; 250/222.1
(58) Field of Classification Search .................. 250/221, 250/222.1; 340/555–557
See application file for complete search history.

(56) References Cited

U.S. PATENT DOCUMENTS

| | | | |
|---|---|---|---|
| 6,167,991 B1 | 1/2001 | Full et al. | |
| 6,779,760 B2 | 8/2004 | Chang et al. | |
| 6,872,932 B2 * | 3/2005 | Emmanuel | 250/221 |
| 7,126,144 B2 * | 10/2006 | De Coi | 250/559.12 |
| 2005/0211883 A1 * | 9/2005 | Lohmann | 250/221 |

* cited by examiner

*Primary Examiner* — Tony Ko
(74) *Attorney, Agent, or Firm* — Ingrassia Fisher & Lorenz, P.C.

(57) ABSTRACT

A method and system for scanning a multiple light beam system, such as a safety light curtain, uses a plurality of transmission signals including two or more synchronization signals for synchronizing a beam receiver module with a beam transmission module. The system has transmitter circuitry which generates the transmission signals for driving light sources of the transmission module and receiver circuitry which receives corresponding transmitted signals. The receiver circuitry generates a scanning initialization signal using an uninterrupted synchronization signal among the reception signals for synchronizing the receiver module with the transmission module and scans the receiver module in response to generation of the scanning initialization signal.

20 Claims, 9 Drawing Sheets

SCANNING METHOD AND SYSTEM FOR A MULTIPLE LIGHT BEAM SYSTEM

TECHNICAL FIELD

Embodiments are generally related to scanning methods and, in particular, to methods of scanning multiple light beam systems, such as safety light curtains. Embodiments are additionally related to scanning systems, especially scanning systems for scanning safety light curtains or other multiple light beam systems.

BACKGROUND

Scanning systems for scanning multiple light beam systems, such as light curtains, have a plurality of light sources in an emitter column and a plurality of light receivers, each one associated with one light source, in a separate receiver column. Light curtains can be used for example in industrial safety applications to protect people working on dangerous machines in order to stop the machine if people enter a dangerous zone around the machine. The scanning system of such a light curtain is used to allow each individual light source to emit during a certain time window and the corresponding light receiver to receive accordingly. Beams are transmitted from respective individual light emitters to respective corresponding receivers in a sequential manner and the full light curtain is scanned every cycle.

In order to allow a full synchronization between the emitter column and the receiver column without a cable between the two units, an optical beam is often used as a synchronization beam. Light pulses emitted by the synchronization beam usually include coded information on the type of light curtain, the number of beams, the resolution of the light curtain and any other appropriate information. Using an optical synchronization beam between the emitter column and the receiver column ease the cabling of the light curtain as the emitter and receiver can be sometimes far away from one and other (up to 80 m in some applications) and often in a strong EMC environment.

It is believed that the scanning system and method, as indicated by the embodiments described herein, can be used to scan a safety light curtain in a more effective manner.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

According to one aspect, a method for scanning a multiple light beam system having beam transmission and receiver modules comprises: generating a plurality of transmission signals for driving respective light sources of the transmission module; the plurality of transmission signals including two or more synchronization signals; receiving corresponding signals transmitted from the beam transmission module to the beam receiver module; detecting an uninterrupted synchronization signal among the reception signals; synchronizing the receiver module with the transmission module using the detected uninterrupted synchronization signal in order to synchronize the multiple light beam system; and scanning the receiver module synchronized with the transmission module.

By generating a plurality of synchronization beam signals and using an uninterrupted synchronization beam signal in order to synchronize the receiver circuitry with the transmitter circuitry, the scanning method avoids the limitations of other scanning systems for light curtains which use single beam synchronization. The scanning method allows the detection zone including one or more synchronization beams distributed in the detection zone to be blanked whilst maintaining synchronization provided that all the synchronization beams are not interrupted at once.

The method can further comprise detecting another uninterrupted synchronization signal among the reception signals in response to detecting an interruption of the uninterrupted synchronization signal; synchronizing the transmission module with the receiver module using the another uninterrupted synchronization signal in order to synchronize the multiple light beam system; and scanning the receiver module synchronized using the another uninterrupted synchronization beam.

According to another aspect, the method for scanning a multiple light beam system having beam transmission and reception modules for transmitting and receiving light beams, respectively; the method comprising generating a plurality of transmission signals for driving respective light sources of the transmission module; the plurality of transmission signals including two or more synchronization signals; receiving corresponding signals transmitted from the transmission module; and generating a scanning initialization signal using an uninterrupted synchronization signal among the reception signals for synchronizing the receiver module with the transmission module; and scanning the receiver module in response to receiving the scanning initialization signal.

The scanning synchronization signals can be a master and slave synchro signals. The method can further comprise generating the scanning initialization signal using an uninterrupted master synchro signal for synchronizing the receiver module with the transmission module; and generating another scanning initialization signal using an uninterrupted slave synchro signal among the reception signals in response to detecting omission of the master synchro signal among the reception signals. The method can also include generating yet another scanning initialization signal using the uninterrupted master synchro signal for re-synchronizing the transmission module with the receiver module in response to re-detecting the uninterrupted master synchro signal among the reception signals.

The method can include turning off the multiple light beam system in response to detecting omission of all of the synchronization signals among the reception signals. Also, the method can include encoding each synchronization signal for transmission in a different format.

According to yet another aspect, a scanning system for scanning multiple light beams systems, the scanning system has a transmitter circuitry adapted and arranged to generate a plurality of transmission signals for driving respective light sources of a beam transmission module. The transmission signals can include a plurality of synchronization signals. The receiver circuitry can be adapted and arranged to receive corresponding reception signals transmitted from the beam transmission module module to a beam receiver module, and generate a scanning initialization signal using an uninterrupted synchronization signal among the reception signals for synchronizing the receiver module with the transmission module; and initiate scanning of the receiver module using the scanning initialization signal.

The synchronization signals can be master and a slave synchro signals. The receiver circuitry can be adapted and arranged to: generate said scanning initialization signal using an uninterrupted master synchro signal for synchronizing said receiver module with said transmission module; and generate another scanning initialization signal using an uninterrupted slave synchro signal among said reception signals in response to detecting omission of the master synchro signal among the reception signals.

The receiver circuitry can be further adapted and arranged to generate yet another scanning initialization signal using the uninterrupted master synchro signal for re-synchronizing the transmission module with the receiver module in response to re-detecting the uninterrupted master synchro signal among the reception signals.

The receiver circuitry can be further adapted and arranged to turn off the multiple light beam system in response to detecting omission of all of the synchronization signals among the reception signals.

The receiver circuitry can be further adapted and arranged to encode each synchronization signal for transmission in a different format.

The receiver circuitry can be further adapted to include a different or similar message in each of the master synchro and the slave synchro signals.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

In many typical industrial safety applications, a function of the light curtain called blanking is used. Blanking is a function in which one or more defined area(s) of the detection zone of the light curtain are configured such that parts of a work piece or machine can project into the detection zone without generating an OFF signal out at the light curtain. The work piece or part of the machine is seen by the light curtain but not signaled on its outputs. When using single synchronization beam scanning systems, most of the time every part of the light curtain detection zone can be blanked except the synchronization beam but if the synchronization beam is broken by a work piece or a part of the machine, the receiver column is no longer synchronized with the emitter column and light curtain goes to an OFF state.

A multiple light beam system generally has a transmission module, which has a plurality of light sources arranged in an emitter column, and a receiver module, which has a plurality of light receivers, each one associated with one light source, arranged in a separate receiver column. Each light source and light receiver transmits light at the same wavelength.

In general, the scanning system for scanning the multiple light beam system generally includes transmitter circuitry operably linked to the light sources to control each individual light source to emit light during a certain time window. Transmission signals are generated by the transmitter circuitry. The transmission signals are for driving respective light sources to generate a plurality of light beams comprising V1-Vn light beams. The minimum number (N) of light sources and corresponding light receivers is one and there is no theoretical upper limit to the number (N). In practice, (N) is limited by the electrical and mechanical components of the system (power supply, the wired connections, the electromagnetic compatibility etc. . . . ). Receiver circuitry is operably linked to the light receivers to receive the emitted light beams accordingly. The transmitter The transmitter circuitry is also operably to provide additional transmission signals for driving light sources to generate at least two synchronization beams and the receiver circuitry is operable to receive the corresponding emitted light synchronization beams.

By providing transmitter and receiver circuitry adapted and arranged to generate and receive a plurality of synchronization beam signals and using an uninterrupted synchronization beam signal in order to synchronize the receiver circuitry with the transmitter circuitry, the scanning system of the illustrative embodiments avoids the aforementioned limitations of other scanning systems which use single beam synchronization. The scanning system of the illustrative embodiments allows the detection zone including one or more synchronization beams distributed in the detection zone to be blanked whilst maintaining synchronization provided that all the synchronization beams are not interrupted at once.

In one implementation, the multiple light beam system is a safety light curtain. However, the scanning system can be for scanning other types of multiple light beam systems having a transmission module for transmitting multiple light beams and a receiver module for receiving the multiple light beams transmitted from the transmission module.

Figure 1A:
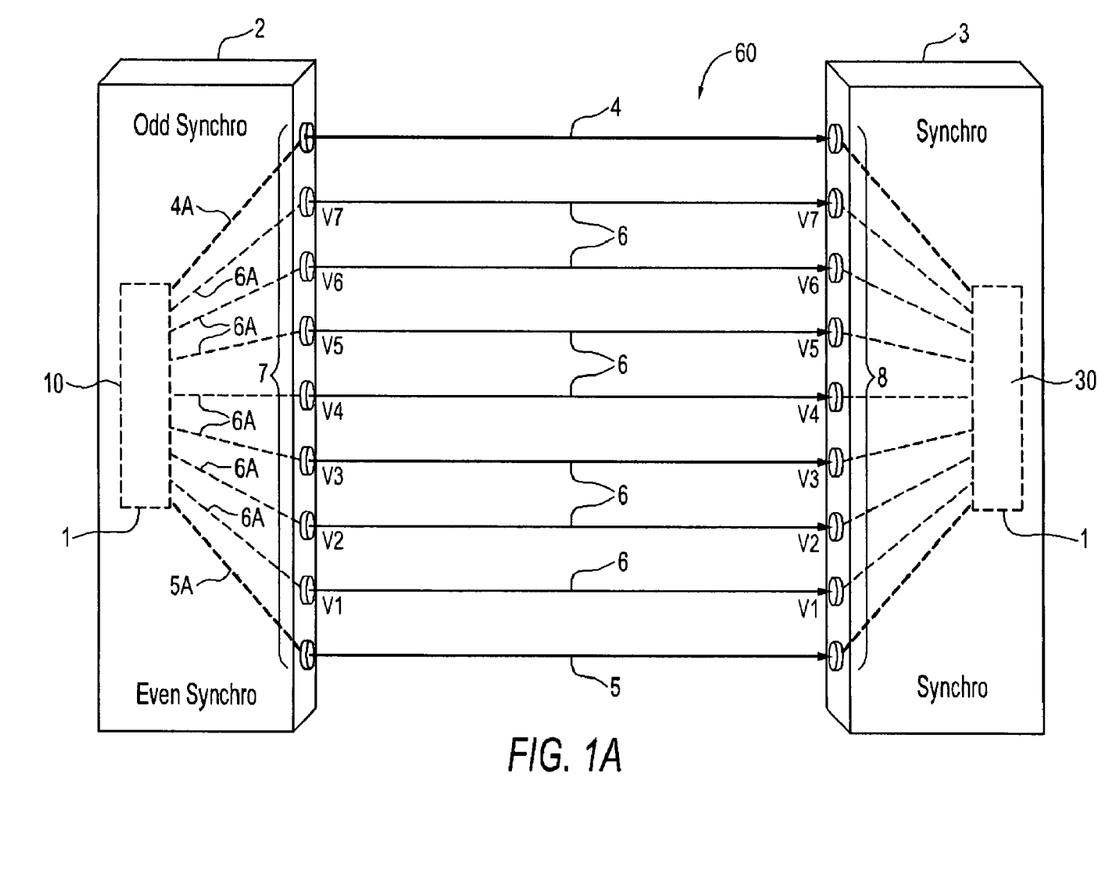
FIG. 1A illustrates a scanning system in accordance with a preferred embodiment incorporated in a safety light curtain.
Figure 1B:
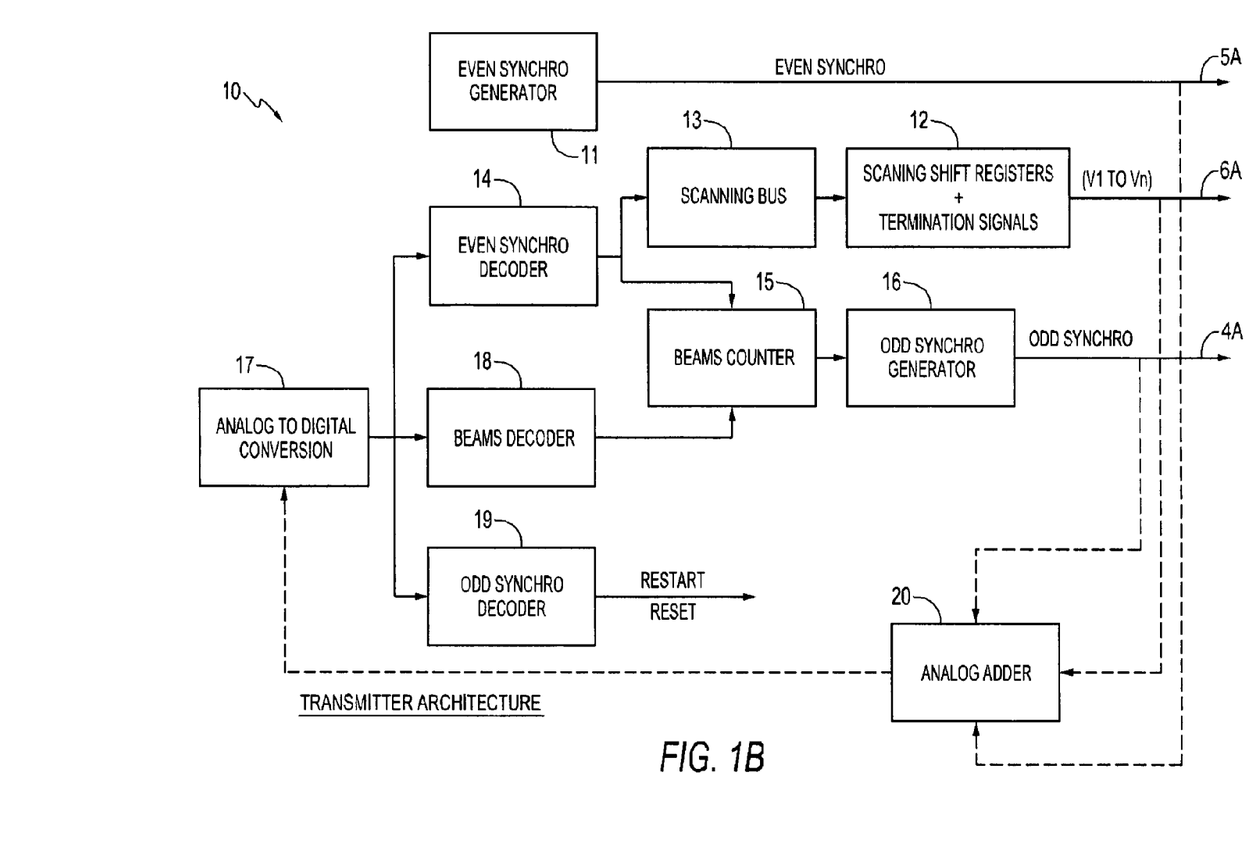
FIG. 1B illustrates the transmitter architecture of the scanning system of FIG. 1A.
Figure 1C:
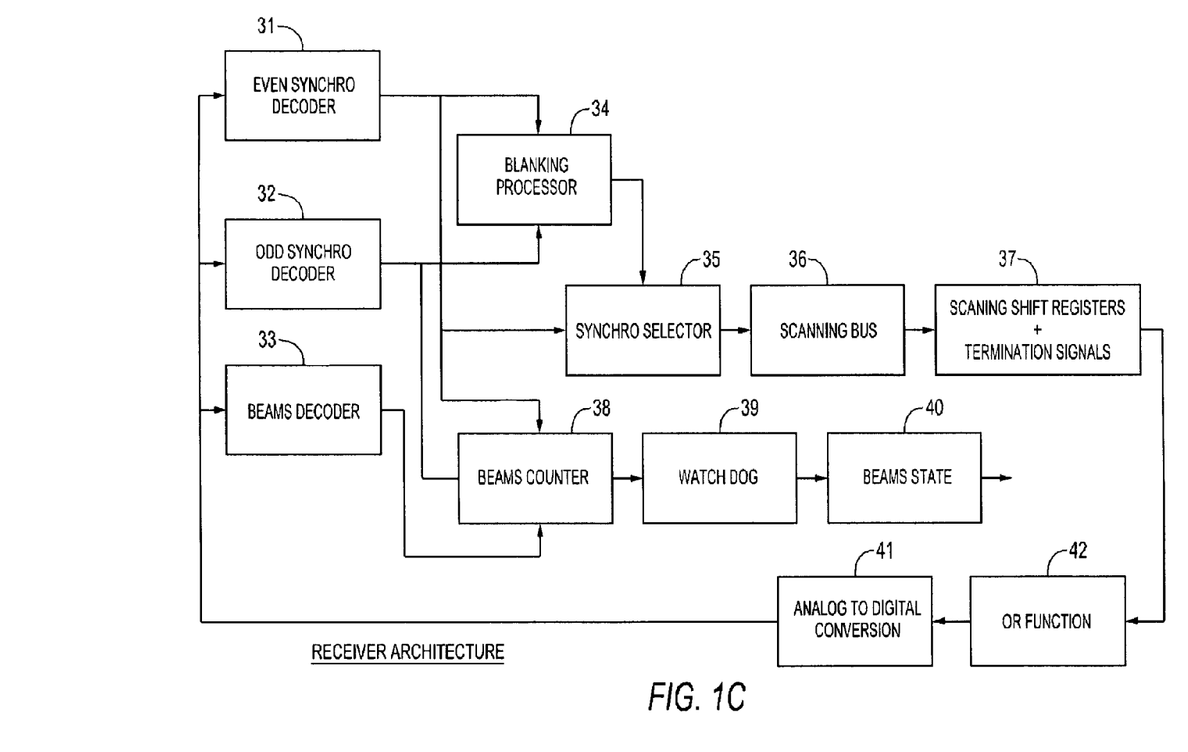
FIG. 1C illustrates the receiver architecture of the scanning system of FIG. 1A.

Referring to FIGS. 1A to 1C, which illustrate a scanning system for a multiple light beam system according to one embodiment, a scanning system 1 is integrated in a multiple light beam system 60 for scanning multiple light beams 4-6.

The scanning system has transmitter circuitry 10 and receiver circuitry 30 adapted and arranged to control transmission and reception of light beams 4-6 from the transmission module 2 to the reception module 3 of the light curtain. The transmitter circuitry 10 is adapted and arranged to generate a plurality of transmission signals 4A-6A for driving respective light sources 7 of the transmission module 2 to generate corresponding light beams 4-6. As will be explained in more detail, the receiver circuitry 30 is configured to use an uninterrupted synchronization beam signal 4, 5 in order to synchronize the receiver circuitry with the transmitter circuitry.

As indicated in FIGS. 1A-1C, transmitter circuitry 10 is configured to generate one synchronization signal 5A comprising an even synchro signal for driving an even synchro beam light source of the transmitter module and another synchronization signal 4A comprising an odd synchro signal, for driving the odd synchro light source. The even and odd synchro signals serve as the master synchronization signal at the beginning of the transmitter scanning process and the slave synchronization signal at the end of the transmitter scanning process, respectively. Receiver circuitry 30 is configured to receive the synchronization beams 4, 5 and generate a corresponding even synchro signal for the master synchronization and a corresponding odd synchro signal for the slave synchronization. The odd synchro can act like a single beam or can replace the master synchronization. Even synchro" is used herein to ref to "a master synchro" whereas "odd synchro is used herein to refer to "a slave synchro".

Transmission signals 6A are for driving respective light sources to generate a plurality of light beams 6 comprising V1-Vn light beams. In the particular illustrative embodiment of the system of FIG. 1A, N=7 so that the plurality of light beams 6 comprise light beams V1-V7.

Referring to transmitter circuitry 10 of FIG. 1B in more detail, the transmitter circuitry has an even synchro generator 11 for generating the even synchronization signal 5A, an odd synchro generator 16 for generating the odd synchronization signal 4A and a scanning shift register 12 for generating V1 to Vn light beams for driving the light sources 7 and termination signals at the end of the scanning process. The even, odd and V1 to Vn signals are for driving respective light sources 7 of the light curtain to emit respective light beams.

Transmitter circuitry 10 also includes an analog adder 20 and analog to digital conversion 17 for adding and converting the even, odd and V1 to Vn signals from analogue to digital signals for decoding by respective even synchro decoder 14, beams decoder 18 and odd synchro decoder 19. The even synchro decoder output is coupled to a scanning bus 13, which in turn is fed back to the scanning shift register 12. Even synchro decoder 14 is also coupled to the beams counter 15 as is the output of the beams decoder 18. The output of the odd synchro decoder 19 is coupled to the restart or reset for resetting the scanning process.

Referring to the receiver circuitry 30 of FIG. 1C, the receiver circuitry includes an even synchro decoder 31, odd synchro decoder 32 and beams decoder 33 each having an output connected to beams counter 38 which, in turn, is connected to watch dog 39 and beams state 40. The output of the analog to digital conversion 41 for decoding the even, odd and beam signals, respectively, is connected to the inputs of the odd, even and beam decoders. Even synchro decoder 31, odd synchro decoder 32 are also connected to a blanking processor 34. Outputs of the blanking processor 34 and even synchro decoder 31 are also connected to a synchro selector 35, which, in turn, is connected to a scanning bus 36 followed by scanning shift register 37. The scanning shift register output is connected to digital circuitry in terms of an OR function circuit 42 and analogue to digital conversion 31 whose output is then fed back to the inputs of the even, odd and beam decoders 31, 32, 33.

The OR function circuit 42 performs the or function on each data received (master synchro, salve synchro or V1 to Vn) and the whole data frame is output in series at the end of the analogue to digital converter 41. Decoders 31-33 are configured to wake up when the good information appears at the output of the converter 41. All the scanning timing of the receiver circuitry 30 is normally synchronized on the even synchro signal (master synchro signal). Blanking processor 34 is configured to generate a simulated synchro signal using the odd synchro data (slave synchro data) in the event that the even synchro beam (master synchro beam) is not received.

In the illustrative embodiment of the scanning system of FIG. 1A, the scanning system is being used to control scanning of the light sources which are infra-red lights sources and the transmitter and receiver circuitry are configured to control emission and reception of modulated infra-red beams, respectively. Beams having wavelengths other than in the infra-red wavelength range can alternatively be used using light sources configured to emit beams of the desired wavelength.

The scanning system is adapted to allow scanning of the light receivers of the receiver module in a synchronous way with the light sources of the module of emission. The code of synchronization integrates two types of information: the format of the transmission (beginning and end of the message), referred to hereinafter as F, and a and a message to transmit (like the resolution and the height of the barrier for example), referred hereinafter as M.

Emission module 2 is entirely autonomous and does not require any external information resulting from receiver module 3 to function. Emission module 2 can be configured under several different resolutions (ex 14 mm, 20 mm, 30 mm and 60 mm). The resolution being the distance between the centers of two optical beams plus a diameter of lens of the light sources (or a diameter of the spot luminous on exiting the emission module. Light curtain resolution (sometimes called minimum object sensitivity) is the minimum object size that will interrupt at least one light beam when it enters the sensing field. Anything entering the sensing field equal to or greater than this minimum size will be detected. Resolution is not affected by scanning distance or dust accumulation. For safety reason, light curtain does not have a sensitivity adjustment. Two factors determine the resolution of the light curtain: beam pitch and optical lens diameter. The Lens diameter is the smallest width that will block a single light beam.

As will be explained in more detail below, continuous acquisition on all the optical pathways (V) of the receiver module 3 is made possible by treatments of the emission/reception of at least two messages of synchronization.

Following powering, the receiver module is on standby of an even synchro in conformity. The good recognition of the format or the code of synchronization will result in generating the clocks necessary to decode the optical ways. In the possibility of the reception of an erroneous code or absence of code (caused by screening of the beam for example), the analysis of the code heretheto could not be done; resulting in a total stop of the scanning of the receiver.

Formats for even synchro (FE) and odd synchro (FO) are coded differently. The synchronization messages remain the same or can be different according to the targeted application.

Figures 3A, 3B:
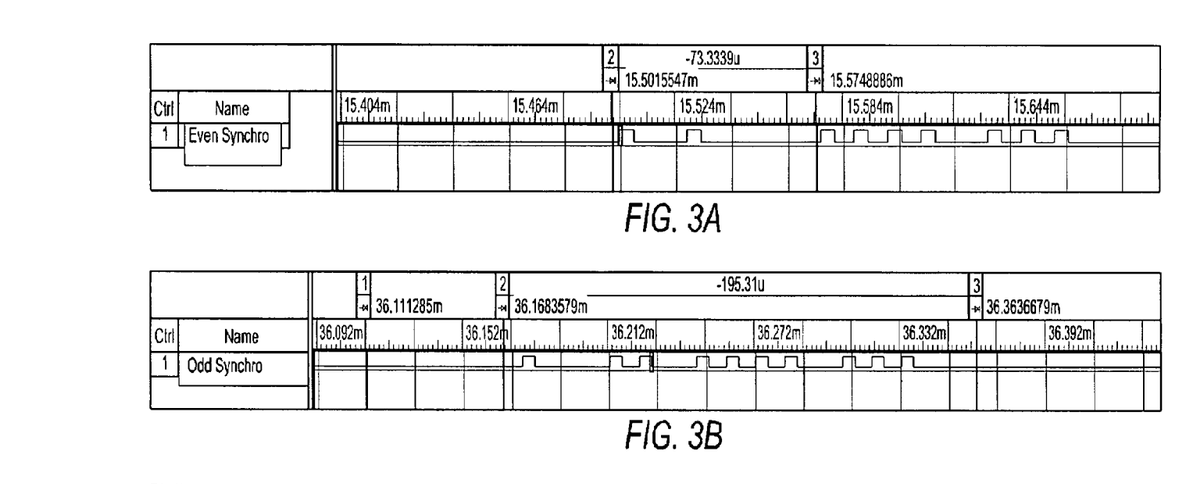
FIG. 3A illustrates a computer screen shot of an exemplary waveform of a serial transmission of the even code.
FIG. 3B, which illustrates a computer screen shot of an exemplary waveform of the serial transmission of the odd code.

Referring to FIG. 3A, which illustrates a screen shot of an exemplary waveform of a serial transmission of the even code, transmission is divided in two parts, the first one is the coding format and the second one is the synchro code. In the example, message coding of even synchro (FE) uses 6 bits, for the even format FE (5,0), the binary sequence is (for instance) FE5, FE4, FE3, FE2F, FE1, FE0=000101, FE4 being a bit for parity check of the format Referring to FIG. 3B, which illustrates a screen shot of an exemplary waveform of the serial transmission of the odd code, transmission is divided in two parts: the first one is the coding format and the second one is the synchro code. Whole coding in the example is a 14 bit coding. In the example, message coding of odd synchro (FO) uses 6 bits, for the odd format FO (5,0), the binary sequence is (for instance) FO5, FO4, FO3, FO2, FO1, FO0=011001, FO4 being a bit of parity check of the format.

Figure 3C:
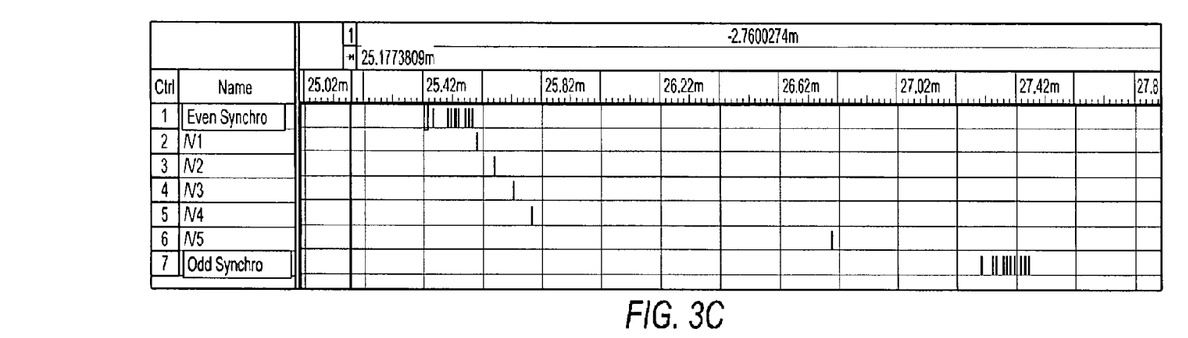
FIG. 3C illustrates a computer screen shot of an exemplary scanning frame: even synchro beam single beams (V1, v2==>Vn), odd synchro beam.

FIG. 3C illustrates a screen shot of an exemplary scanning frame: even synchro beam, single beams (V1, v2==>Vn), odd synchro beam.

In the light curtain in which the scanning system of FIG. 1A is configured, the synchronization beams 4, 5 are arranged at each end of the detection field, that is, an even synchronization beam 5 at one end of the detection field and an odd synchronization beam 4 at the other end, as shown in FIG. 1A. The scanning system 1 is configured such that if the even synchronization beam 5 is not broken it is then used to synchronize the receiver with the emitter signals. The scanning system is further configured such that, if the even synchronization beam is broken, then the system forces one single scanning frame in order to catch the odd synchronization beam 4 and, provided the odd synchronization beam is not broken, synchronization of the receiver on the emitter signals is performed using the odd synchronization beam. Otherwise, if the odd synchronization beam is broken, the light curtain goes to the OFF state.

As will be explained in more detail below, the blanking processor 34 of the receiver circuitry 30 is adapted and arranged to analyze synchronization of the beams to detect an interruption of the even synchronization beam and cause the system to force and synchronize the emission module with the receiver module using the uninterrupted odd synchronization beam in order to synchronize the receiver module with the emission module.

Scanning system of FIG. 1A is configured to operate in several different scanning modes. A first scanning mode allows scanning of the light curtain in the event that neither synchronization beam is interrupted. A second scanning mode allows scanning of the light curtain in the event that the even synchronization beam used to synchronize the receiver module with the emission module is interrupted but the odd synchronization beam is uninterrupted. A third scanning mode allows scanning of the light curtain in the event that the even synchronization beam used to synchronize the receiver module with the emission module is left uninterrupted but the odd synchronization beam is interrupted. A fourth scanning mode allows switching off the light curtain in the event that both odd and even synchronization beams are interrupted.

Figure 2:
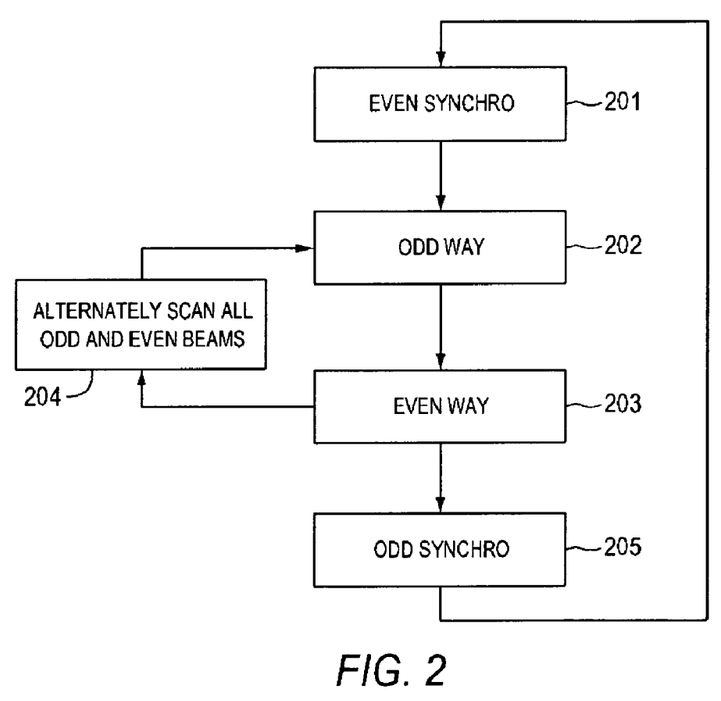
FIG. 2 illustrates a flow chart outlining the synchronization sequence of the scanning system of FIG. 1A.

A method of scanning a light curtain will now be described according to one embodiment with reference to the scanning system of FIG. 1A. By way of example, let us assume that at the time of an intrusion (finger, hand or greater part of the body), the two ways of synchronization will never be occulated simultaneously. The beam emission sequence controlled by the scanning system is indicated in FIG. 2, which illustrates a flow chart of the sequence. First beam transmitted is the even synchronization code (process step 201). The next process step 202 is the transmission of the first odd beam. Due to the redundancy of the processing, the opposite parity must be transmitted. For the same reason, an even beam must be activated after an odd transmission (process step 203). Before the transmission on the odd synchronization code, it is necessary to scan alternatively all the even and odd single beams (process step 204). At the end of the scanning process, the odd synchronization code is transmitted (process step 205) and the scanning process is restarted.

Figure 4:
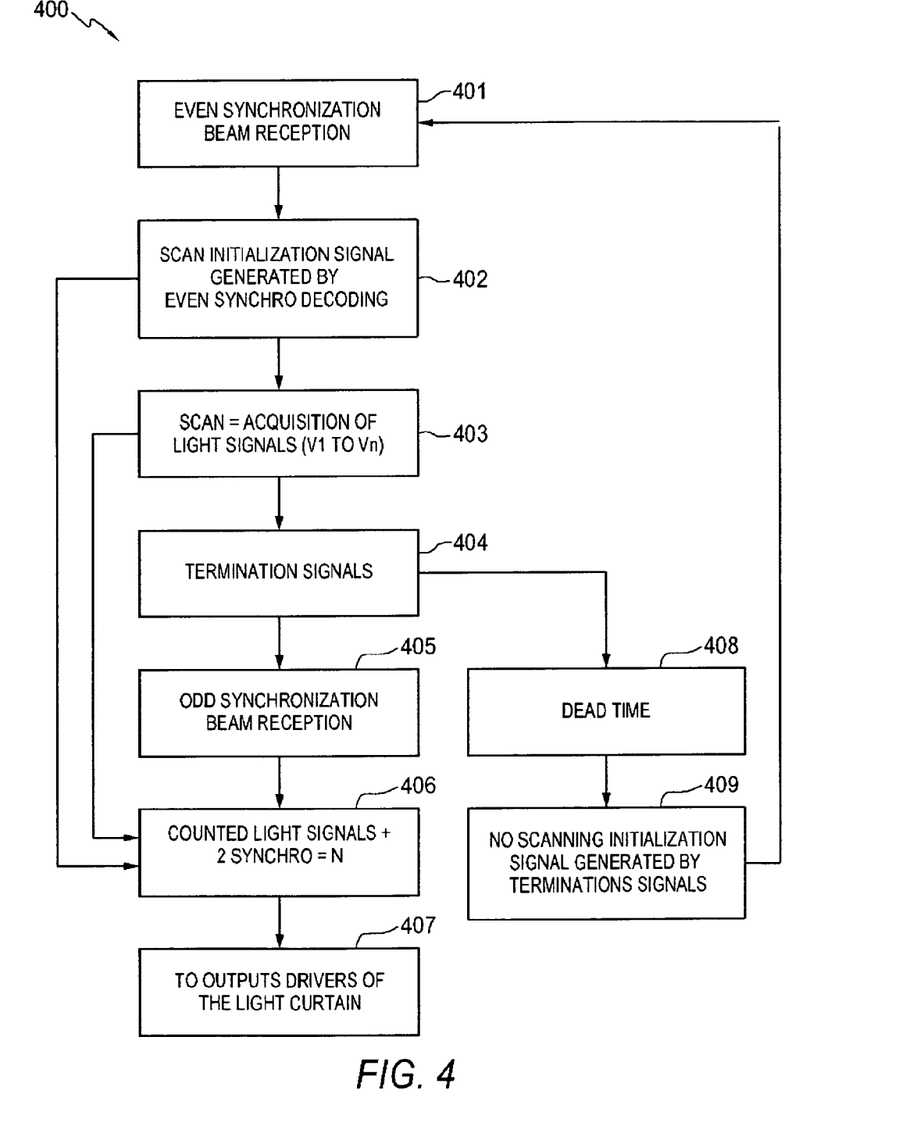
FIG. 4 illustrates a first scanning mode of the scanning system of FIG. 1A according to an embodiment.

Referring to FIG. 4, which illustrates a first scanning mode 400 according to an embodiment in which there is no interruption of both the even and odd synchronization beams, the even synchronization beam is being received, that is, the even synchro is detecting the even synchronization beam, as indicated in process step 401. The even synchro device generates a scanning initialization signal for initializing scanning of the light, as indicated in process step 402. The even synchronization beam can, for example, be encoded according to the format shown in FIG. 3A. Thereafter, the light curtain is scanned by the scanning system to enable acquisition of the curtain light signals (V1 to Vn) including the synchronization beam signals, as indicated in process step 403. The scanning is ended by the reception of the terminations signals (last bit of the scanning register) step 404. The odd synchronization beam is being received, as indicated in step 405 (after the validation of the step 404 by the processing unit). As indicated in block 406, the counted curtain light signals plus the odd and even synchronization light signals will therefore be equal to N. If the N number of beams scanned is reached, it means that the optical field is free, so the output switching device (OSSD) of the light curtain can be driven on the on state. The lights signals are sent to the output drivers of the light curtain. When step 404 is validated after a dead time 408, the odd synchro does not generate a scanning initialization signal for initializing scanning of the light curtain, as indicated in process step 409 and the process returns to step 401 in which the even synchronization is receiving.

Figure 5:
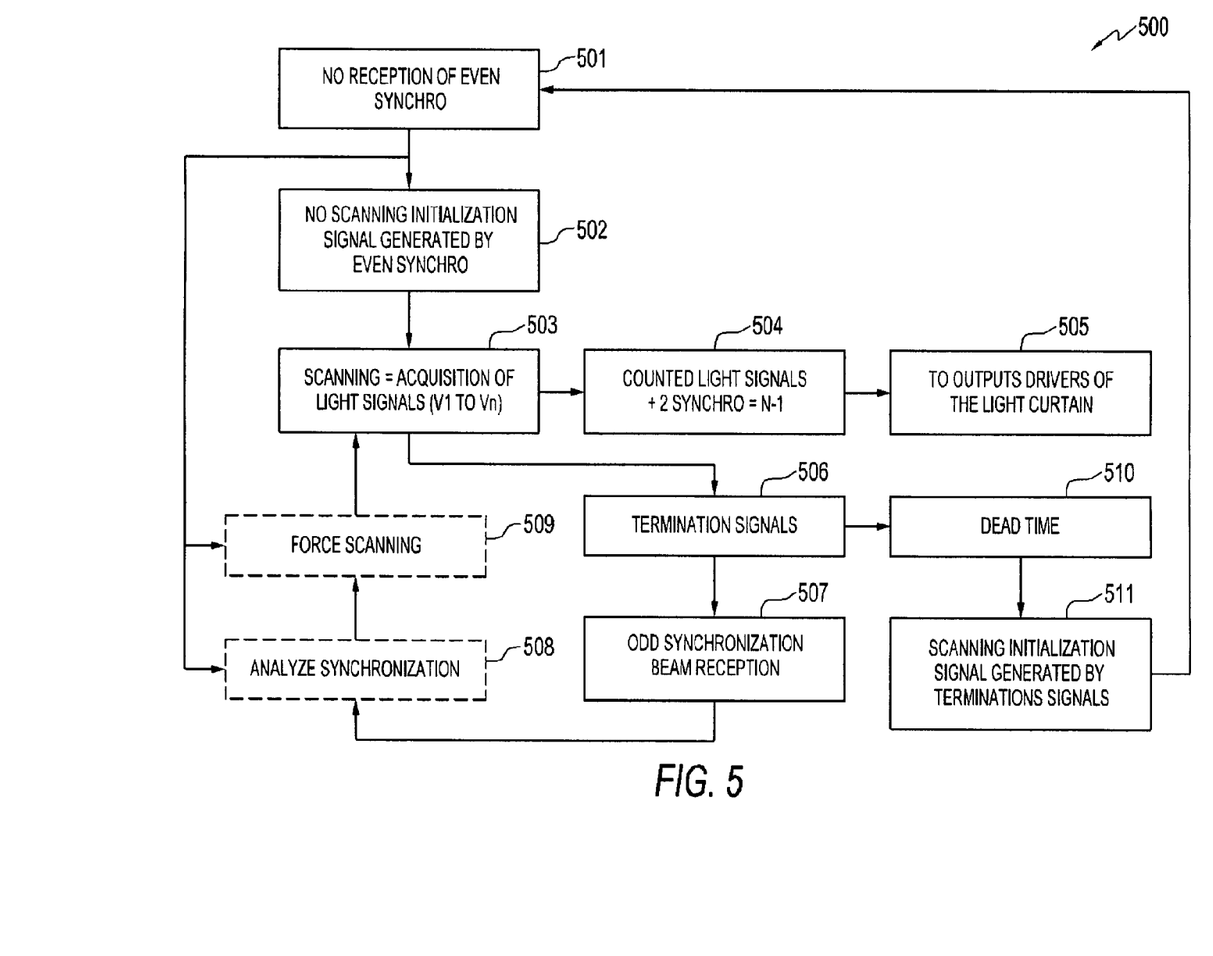
FIG. 5 illustrates a second scanning mode of the scanning system of FIG. 1A 1A according to an embodiment.

Referring to FIG. 5, which illustrates a second scanning mode 500 according to an embodiment in which the even synchronization beam is interrupted; let us assume that the light curtain is being synchronized by the even synchro but that there is a subsequent intrusion causing the even synchronization beam but not the odd synchronization beam to be interrupted. The even synchro is not receiving the even synchronization beam, as indicated in process step 501. The even synchronization beam can, for example, be encoded according to the format shown in FIG. 3A. The even synchro does not generate a scanning initialization signal for initializing scanning of the light curtain, as indicated in process step 502. The odd synchro is receiving the odd synchronization beam (see process step 507). The odd synchronization beam can, for example, be encoded according to the format shown in FIG. 3B.

The synchronization beams are analyzed to detect the lack of reception of the even synchronization beam and reception of the odd synchronization beam, as indicated in process step 508. Scanning is forced in response to receiving a control signals indicating that there is reception of the odd but not the even synchronization beam (process step 509). The blanking processor of the receiver circuitry generates an initialization signal to force the scanning system to scan the light curtain. In response to forcing the scanning, the scanning system scans the light curtain to enable acquisition of the curtain light signals (V1 to Vn), as indicated in process step 503. As already explained above, the odd synchronization beam is being received by the odd synchro, as indicated in process step 507. The counted curtain light signals plus the odd synchronization light signal will therefore be equal to N−1, as indicated in process step step 504, and these are passed to the output drivers of the light curtain (process step 505) During deadtime (step 510), there is no scanning. Following deadtime, (step 510), initialization signal for initializing scanning of the light curtain is then generated by the termination signals, as indicated in process step 506.

Figure 6:
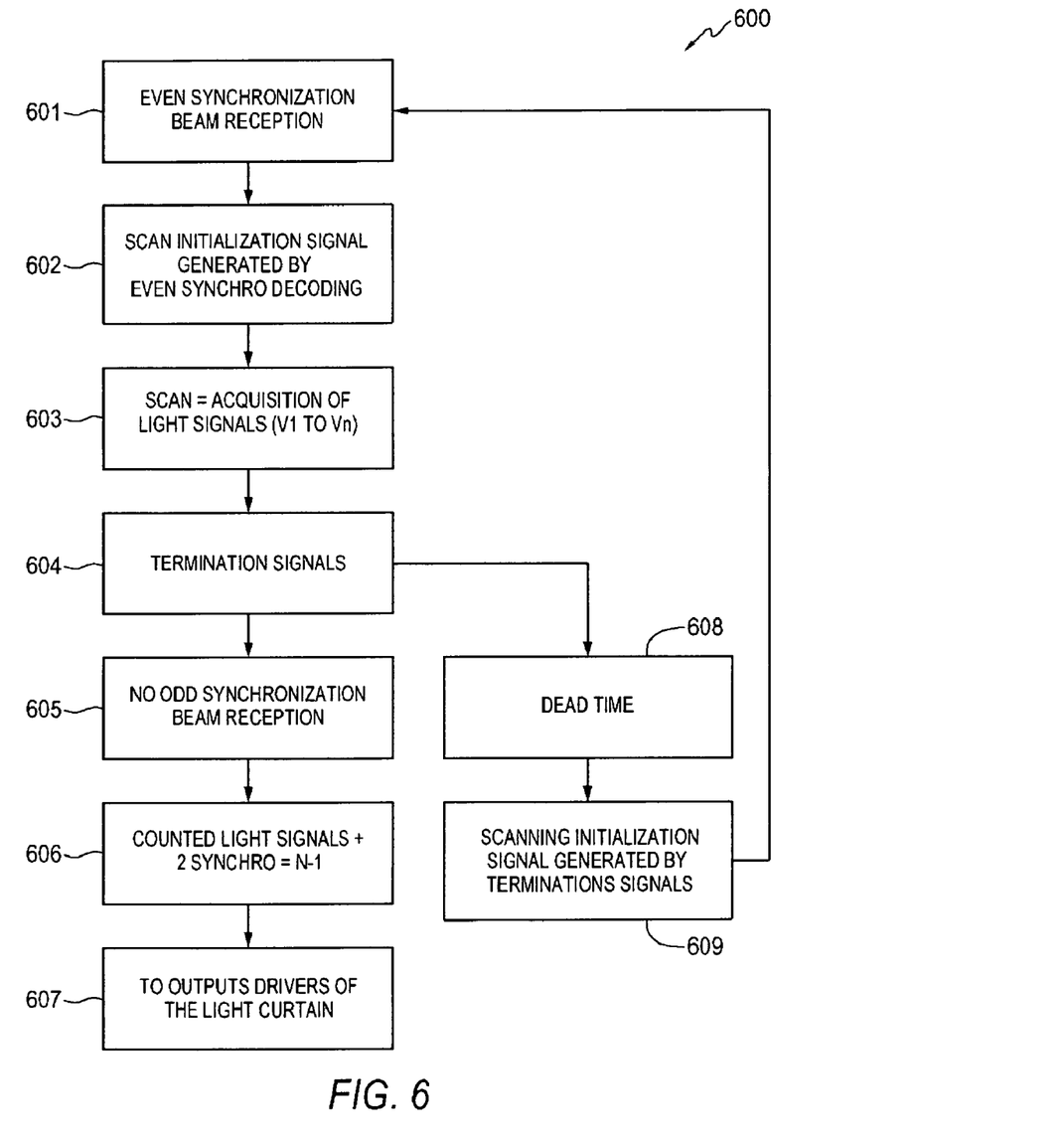
FIG. 6 illustrates a third scanning mode of the scanning system of FIG. 1A according to an embodiment.

Referring to FIG. 6, which illustrates a third scanning mode 600 according to an embodiment in which the odd synchronization beam is interrupted, let us assume that the light curtain is being synchronized by the even synchronization beam and there is an intrusion causing the odd synchronization beam but not the even synchronization to be interrupted. The even synchronization is receiving the even synchronization beam, as indicated in process step 601. The even synchro receiving the even synchronization beam generates a scanning initialization signal for initializing scanning of the light, as indicated in process step 602. The even synchronization beam can, for example, be encoded according to the format shown in FIG. 3A. Thereafter, the light curtain is scanned by the scanning system to enable acquisition of the curtain light signals including the synchronization beams (V1 to Vn), as indicated in process step 603, and termination signals are rendered (process step 604). During dead time (process step 608) there is no scanning. After dead time (process step 608), a scanning initialization signal is generated by termination signals (609) and the process returns to process step 601. As the odd synchronization beam has been interrupted, the odd synchro is not receiving the odd synchronization beam, as indicated in step 605. As indicated in block 606, the counted curtain light signals plus the even synchronization signal will therefore be equal to N−1 and the signals are passed to the output drivers of the light curtain.

Figure 7:
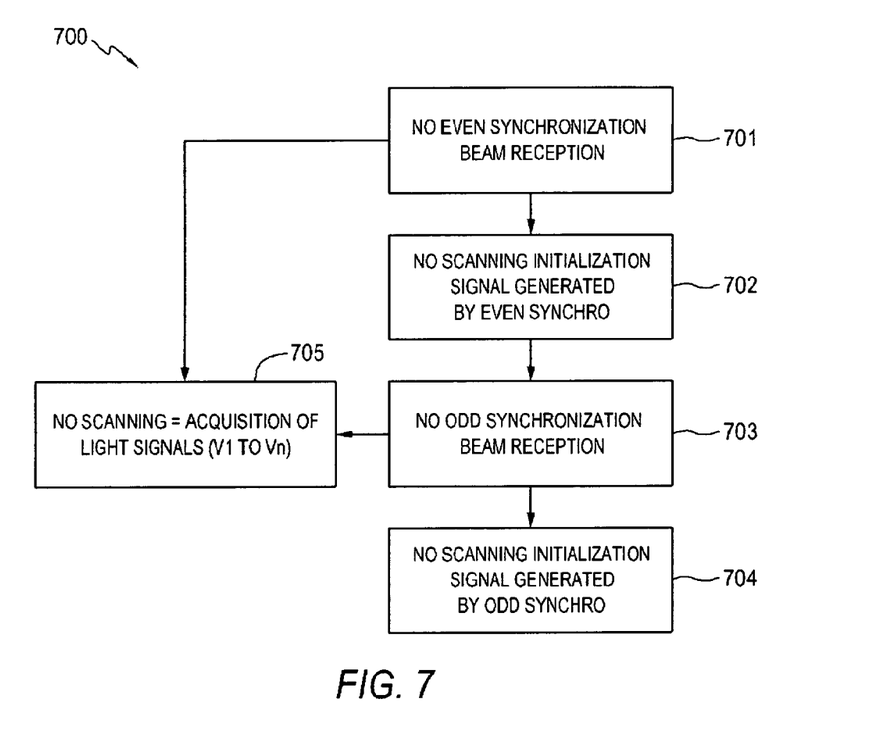
FIG. 7 illustrates a fourth scanning mode of the scanning system of FIG. 1A according to an embodiment.

Referring to FIG. 7, which illustrates a fourth scanning mode 700 according to an embodiment in which both the odd and even synchronization beams are interrupted, let us assume there is an intrusion which blocks both synchronization beams. As indicated in process step 701, the odd synchronization beam is not receiving. No scanning initialization signal is generated by the odd synchro (see process step 702). As indicated in process step 703, the even synchronization beam is not receiving. No scanning initialization signal is generated by the even synchro (see process step 704). The light curtain is not scanned so that there is no acquisition of light signals, as indicated in process step 705.

The synchronization analysis as well as forcing scanning is broken down into the phases (i) and (iii) because the signal of synchronization of the highest weight is present and of fact, one is placed in the case of a conventional scanning since signals of synchronization of weight inferiors are then regarded as simple ways.

In alternative embodiments of the scanning system and method, more than two signals of synchronization can be employed. Each signal will be affected by a weight. The highest weight (N) manages by default the reception scanning. In the preceding example, it acted of even synchronization. If synchronization N misses, it is the synchronization (N−1) which will deal with management of sweeping and so on.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims.

It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention what is claimed is:

1. A method for scanning a multiple light beam system having beam transmission and reception modules; said method comprising
    generating a plurality of transmission signals for driving respective light sources of the transmission module; said plurality of transmission signals including at least two synchronization signals;
    receiving corresponding signals transmitted from the transmission module;
    detecting an uninterrupted synchronization signal among said reception signals;
    synchronizing said receiver module with said transmission module using said detected uninterrupted synchronization signal in order to synchronize said multiple light beam system; and
    scanning the receiver module synchronized with said transmission module.

2. The method of claim 1, further comprising
    detecting another uninterrupted synchronization signal among said reception signals in response to detecting an interruption of said uninterrupted synchronization signal;
    synchronizing said transmission module with said receiver module using said another uninterrupted synchronization signal in order to synchronize said multiple light beam system;
    scanning said receiver module synchronized using said another uninterrupted synchronization beam.

3. The method of claim 1, further comprising
    turning off said multiple light beam system in response to detecting interruption of all of said synchronization signals.

4. The method of claim 1, further comprising encoding each synchronization signal for transmission in a different format.

5. The method of claim 1, wherein said at least two synchronization signals comprise a master synchro signal and a slave synchro signal and further comprising
    detecting interruption of said master synchro among said reception signals;
    detecting an uninterrupted slave synchro signal among said reception signals;
    generating a simulated synchro signal using said uninterrupted slave synchro signal; and
    synchronizing said receiver module with said transmission module using said simulated synchro signal in order to synchronize said multiple light beam system.

6. The method of claim 5, further comprising
    following synchronizing said receiver module with said transmission module using said simulated synchro signal, detecting an uninterrupted master synchro signal among said reception signals; and
    synchronizing said receiver module with said transmission module using said master synchro signal in order to synchronize said multiple light beam system.

7. A method for scanning a multiple light beam system having beam transmission and reception modules for transmitting and receiving light beams, respectively; said method comprising
    generating a plurality of transmission signals for driving respective light sources of the transmission module; said plurality of transmission signals including at least two synchronization signals;

receiving corresponding signals transmitted from the transmission module;

generating a scanning initialization signal using an uninterrupted synchronization signal among said reception signals for synchronizing said receiver module with said transmission module; and scanning said receiver module in response to receiving said scanning initialization signal.

8. The method of claim 7, wherein said synchronization signals comprises a master and a slave synchro signals; and further comprising:

generating said scanning initialization signal using an uninterrupted master synchro signal for synchronizing said receiver module with said transmission module; and generating another scanning initialization signal using an uninterrupted slave synchro signal among said reception signals in response to detecting omission of said master synchro signal among said reception signals.

9. The method of claim 8, further comprising generating yet another scanning initialization signal using said uninterrupted master synchro signal for re-synchronizing said transmission module with said receiver module in response to re-detecting said uninterrupted master synchro signal among said reception signals.

10. The method of claim 7, further comprising
turning off said multiple light beam system in response to detecting omission of all of said synchronization signals among said reception signals.

11. The method of claim 7, further comprising encoding each synchronization signal for transmission in a different format.

12. The method of claim 11, further comprising
encoding the master synchro and slave synchro signals differently, and
including a different or similar message in each of said master synchro and said slave synchro signals.

13. A scanning system for scanning multiple light beams systems, said scanning system having:

transmitter circuitry configured to generate a plurality of transmission signals for driving respective light sources of a beam transmission module; said transmission signals including a plurality of synchronization signals; and receiver circuitry configured to:
receive corresponding signals transmitted from the beam transmission module to a beam receiver module;
generate a scanning initialization signal using an uninterrupted synchronization signal among said reception signals for synchronizing said beam receiver module with said beam transmission module; and
initiate scanning of said beam receiver module using said scanning initialization signal.

14. The system of claim 13, wherein said synchronization signals comprise master and a slave synchro signals; and wherein said receiver circuitry is configured to:
generate said scanning initialization signal using an uninterrupted master synchro signal for synchronizing said receiver module with said transmission module; and
generate another scanning initialization signal using an uninterrupted slave synchro signal among said reception signals in response to detecting omission of said master synchro signal among said reception signals.

15. The system of claim 14, wherein said receiver circuitry is configured to generate yet another scanning initialization signal using said uninterrupted master synchro signal for re-synchronizing said transmission module with said receiver module in response to re-detecting said uninterrupted master synchro signal among said reception signals.

16. The system of claim 13, wherein said receiver circuitry is further configured to turn off said multiple light beam system in response to detecting omission of all of said synchronization signals among said reception signals.

17. The system of claim 13, wherein said receiver circuitry is further configured to encode each synchronization signal for transmission in a different format.

18. The system of claim 14, wherein said receiver circuitry is further configured to include a different or similar message in each of said master synchro and said slave synchro signals.

19. The system of claim 13, wherein said multiple light beam system comprises a safety light curtain.

20. The system of claim 19, wherein said transmission module comprises a column of infra red lights sources and said receiver module comprises a column of corresponding infra red detectors.

* * * * *